US012739386B2

(12) United States Patent
Lainema et al.

(10) Patent No.: US 12,739,386 B2
(45) Date of Patent: Sep. 15, 2026

(54) METHOD, AN APPARATUS AND A COMPUTER PROGRAM PRODUCT FOR ENCODING AND DECODING OF DIGITAL MEDIA CONTENT

(71) Applicant: Nokia Technologies Oy, Espoo (FI)

(72) Inventors: Jani Lainema, Tampere (FI); Pekka Astola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/850,446

(22) PCT Filed: Jan. 18, 2023

(86) PCT No.: PCT/FI2023/050039

§ 371 (c)(1),
(2) Date: Sep. 24, 2024

(87) PCT Pub. No.: WO2023/194647

PCT Pub. Date: Oct. 12, 2023

(65) Prior Publication Data

US 2025/0220189 A1 Jul. 3, 2025

(30) Foreign Application Priority Data

Apr. 5, 2022 (FI) ..................................... 20225295

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/136* (2014.11);
(Continued)

(58) Field of Classification Search
CPC .. H04N 19/132; H04N 19/117; H04N 19/136; H04N 19/176; H04N 19/186; H04N 19/30
See application file for complete search history.

(56) References Cited

U.S. PATENT DOCUMENTS 8,301,451 B2 * 10/2012 Wouters .................. G10L 13/07 704/260
10,708,622 B2 * 7/2020 Budagavi ............... H04N 19/82
(Continued)

FOREIGN PATENT DOCUMENTS

EP 3720129 A1 10/2020
GB 2225883 A 6/1990
(Continued)

OTHER PUBLICATIONS

"Video coding for low bit rate communication", Series H: Audio-visual and Multimedia Systems, Infrastructure of audiovisual services—Coding of moving video, Recommendation ITU-T H.263, Jan. 2005, 226 pages.
(Continued)

*Primary Examiner* — Jae N Noh
(74) *Attorney, Agent, or Firm* — McCarter & English, LLP; Joseph C. Drish

(57) ABSTRACT

The embodiments relate to a method for encoding/decoding, the method comprising obtaining (310) a set of input samples; obtaining (320) a triangular matrix, a cross-correlation vector and a scaling vector by utilizing the set of input samples; determining (330) an intermediate vector with a first back-substitution using the triangular matrix and the cross-correlation vector; scaling (340) the intermediate vector using the scaling vector; determining (350) a filter coefficient vector with a second back-substitution using the triangular matrix and the scaled intermediate vector; and determining (360) predicted sample values for a block of
(Continued)

samples based on the filter coefficient vector. The embodiments also relate to an apparatus and a computer program product for implementing the method.

17 Claims, 3 Drawing Sheets

(51) Int. Cl.
*H04N 19/136* (2014.01)
*H04N 19/176* (2014.01)
*H04N 19/186* (2014.01)
*H04N 19/30* (2014.01)

(52) U.S. Cl.
CPC ......... *H04N 19/176* (2014.11); *H04N 19/186* (2014.11); *H04N 19/30* (2014.11)

(56) References Cited

U.S. PATENT DOCUMENTS

2010/0057467 A1* 3/2010 Wouters .................. G10L 13/07 704/267
2024/0106517 A1* 3/2024 Hu ....................... H04B 7/0854

FOREIGN PATENT DOCUMENTS

| | | | |
|---|---|---|---|
| JP | 2021505074 | A | 2/2021 |
| WO | 2007/111292 | A1 | 10/2007 |
| WO | 2011/064945 | A1 | 6/2011 |
| WO | 2022/060437 | A1 | 3/2022 |
| WO | 2022/144497 | A1 | 7/2022 |

OTHER PUBLICATIONS

"Advanced video coding for generic audiovisual services", Series H: Audiovisual and Multimedia Systems, Infrastructure of audiovisual services—Coding of moving video, Recommendation ITU-T H.264, Aug. 2021, 844 pages.
"High efficiency video coding", Series H: Audiovisual and Multimedia Systems, Infrastructure of audiovisual services—Coding of moving video, Recommendation ITU-T H.265, Aug. 2021, 716 pages.
"Versatile Video Coding", Series H: Audiovisual and Multimedia Systems Infrastructure of audiovisual services—Coding of moving video, Recommendation ITU-T H.266, Aug. 2020, 516 pages.
Zhang et al., "Enhanced Cross-component Linear Model Intra-prediction", Joint Video Exploration Team (JVET) of ITU-T SG 16 WP 3 and ISO/IEC JTC 1/SC 29/WG 11, 4th Meeting, JVET-D0110, Oct. 15-21, 2016, pp. 1-5.
Office action received for corresponding Finnish Application No. 20225295, dated Oct. 28, 2022, 9 pages.
Misra et al., "On Cross Component Adaptive Loop Filter for Video Compression", Proceedings of the Picture Coding Symposium (PCS), Nov. 12-15, 2019, 5 pages.
Tsai et al., "Adaptive Loop Filtering for Video Coding", IEEE Journal of Selected Topics in Signal Processing, vol. 07, No. 06, Dec. 2013, pp. 934-945.
"Cholesky decomposition", Wikipedia, Retrieved on Oct. 23, 2024, Webpage available at : https://en.wikipedia.org/wiki/Cholesky_decomposition.
International Search Report and Written Opinion received for corresponding Patent Cooperation Treaty Application No. PCT/FI2023/050039, dated Jun. 12, 2023, 16 pages.
Li et al., "CE2-related: Improvement on the implementation of adaptive loop filter", Joint Video Experts Team (JVET) of ITU-T SG 16 WP 3 and ISO/IEC JTC 1/SC 29/WG 11, JVET-K0388-v4, 11th Meeting, Jul. 10-18, 2018, pp. 1-3.
Office action received for corresponding Japanese Patent Application No. 2024-559451, dated Oct. 2, 2025, 3 pages of office action and 5 pages of translation available.
Watanabe, "Fundamentals of Systems of Linear Equations~and the Stability of Gauss Elimination~", Numerical Analysis Tutorial, Mar. 2004, 6 pages.
Astola (Nokia) P et al: "EE2-1.1a: 1-15 Convolutional cross-component intra prediction model", 27. JVET Meeting; Jul. 13, 2022-Jul. 22, 2022. Teleconference; (The Joint Video Exploration Team of ISO/IEC JTC1/SC29/WG11 and ITU-T SG. 16 ), Jul. 6, 2022.
Aminlou (Nokia) A et al: "AHG12: 1-15 Division-free operation and dynamic range reduction for convolutional cross-component model (CCCM)", Oct. 14, 2022. Retrieved from the Internet: URL:https://jvet-experts.org/doc_end_user/documents/28_Mainz/wg11/JVET-AB0174-v1.zipJVET-AB0174/JVET-AB0174.docx.
Astola (Nokia) P et al: "EE2-1.1A: 1-15 Convolutional cross-component intra prediction model", 27. JVET Meeting; Jul. 13, 2022-Jul. 22, 2022; Teleconference; (The Joint Video Exploration Team of ISO/IEC JTC1/SC29/WG11 and ITU-T SG.16), Jul. 6, 2022. Retrieved from the Internet:URL:https://jvet-experts.org/doc_end_user/documents/27_Teleconference/wg11/JVET-AA0057-v1.zip JVET-AA0057-v1/JVET-AA0057.docx.

* cited by examiner

Prediction error coding
$I_n$
+
$D_n$
T
Q
E
-
$P'_n$
RFM
$P_{inter}$
MS
$R'_n$
$P_{intra}$
$P'_n$
F
$I'_n$
+
$T^{-1}$
$Q^{-1}$
$D'_n$
Prediction error decoding
Pixel prediction Prediction error decoding $D'_n$
$Q^{-1}$
$T^{-1}$
+
$P'_n$
$E^{-1}$
P
$I'_n$
F
$R'_n$
RFM
Pixel prediction

METHOD, AN APPARATUS AND A COMPUTER PROGRAM PRODUCT FOR ENCODING AND DECODING OF DIGITAL MEDIA CONTENT

RELATED APPLICATION

This application claims priority to PCT Patent Application No. PCT/FI2023/050039, filed 18 Jan 2023, which claims priority from Finland Application No. 20225295, filed on Apr. 5, 2022, which is incorporated herein by reference in its entirety.

TECHNICAL FIELD

The present solution generally relates to encoding and decoding of digital media content, such as video or still image data.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for obtaining a set of input samples; means for obtaining a triangular matrix, a cross-correlation vector and a scaling vector by utilizing the set of input samples; means for determining an intermediate vector with a first back-substitution using the triangular matrix and the cross-correlation vector; means for scaling the intermediate vector using the scaling vector; means for determining a filter coefficient vector with a second back-substitution using the triangular matrix and the scaled intermediate vector; and means for determining predicted sample values for a block of samples based on the filter coefficient vector.

According to a second aspect, there is provided a method, comprising: obtaining a set of input samples; obtaining a triangular matrix, a cross-correlation vector and a scaling vector by utilizing the set of input samples; determining an intermediate vector with a first back-substitution using the triangular matrix and the cross-correlation vector; scaling the intermediate vector using the scaling vector; determining a filter coefficient vector with a second back-substitution using the triangular matrix and the scaled intermediate vector; and determining predicted sample values for a block of samples based on the filter coefficient vector.

According to a third aspect, there is provided an apparatus comprising at least one processor, memory including computer program code, the memory and the computer program code configured to, with the at least one processor, cause the apparatus to perform at least the following: obtain a set of input samples; obtain a triangular matrix, a cross-correlation vector and a scaling vector by utilizing the set of input samples; determine an intermediate vector with a first back-substitution using the triangular matrix and the cross-correlation vector; scale the intermediate vector using the scaling vector; determine a filter coefficient vector with a second back-substitution using the triangular matrix and the scaled intermediate vector; and determine predicted sample values for a block of samples based on the filter coefficient vector.

According to a fourth aspect, there is provided computer program product comprising computer program code configured to, when executed on at least one processor, cause an apparatus or a system to: obtain a set of input samples; obtain a triangular matrix, a cross-correlation vector and a scaling vector by utilizing the set of input samples; determine an intermediate vector with a first back-substitution using the triangular matrix and the cross-correlation vector; scale the intermediate vector using the scaling vector; determine a filter coefficient vector with a second back-substitution using the triangular matrix and the scaled intermediate vector; and determine predicted sample values for a block of samples based on the filter coefficient vector.

According to an embodiment, the triangular matrix and the scaling vector are determined by decomposing an autocorrelation matrix at least into the triangular matrix and the scaling vector, where the autocorrelation matrix is calculated using a set of reference samples in a determined neighborhood of the block of samples.

According to an embodiment, the autocorrelation matrix and the cross-correlation vector are determined by deducting an average luma value from a set of luma values and deducting an average chroma value from a set of chroma values.

According to an embodiment, the autocorrelation matrix and the cross-correlation vector are scaled based on the bit depth of the set of samples.

According to an embodiment, a bitwise shifting operation is included in process of calculating the autocorrelation matrix and the cross-correlation vector.

According to an embodiment, the set of samples comprise one or more of the following: luminance sample values; functions of luminance sample values; bias parameters.

According to an embodiment, wherein the apparatus comprises means for encoding the set of samples and/or decoding the encoded set of samples.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
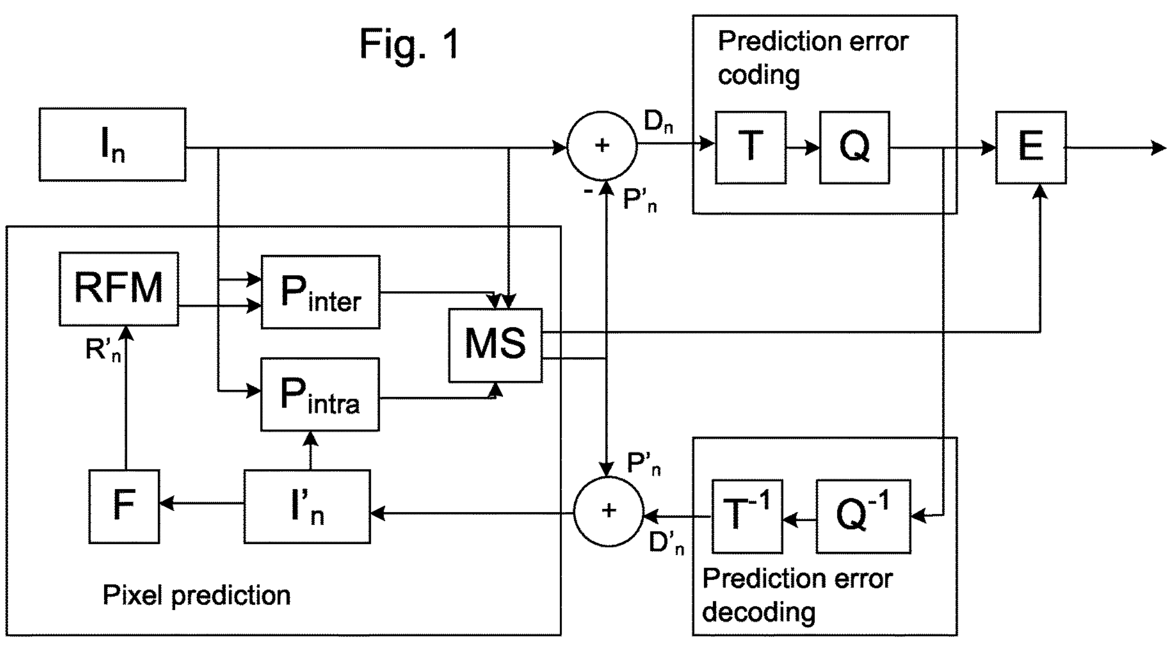
FIG. 1 shows an example of an encoding process.

In the following, several embodiments will be described in the context of one video coding arrangement. It is to be noted, however, that the present embodiments are not necessarily limited to this particular arrangement. The embodiments discussed in this specification relates to intra prediction in video or still image coding using sparse linear cross-component regression.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Video codec comprises an encoder and a decoder. The encoder is configured to transform input video into a compressed representation suitable for storage/transmission. The decoder is able to decompress the compressed video representation back into a viewable form. The encoder may discard some information in the original video sequence in order to represent the video in a more compact form, for example at a lower bitrate.

An elementary unit for the input to an encoder and the output of a decoder, respectively, in most cases is a picture. A picture given as an input to an encode may also be referred to as a source picture, and a picture decoded by a decoder may be referred to as a decoded picture or a reconstructed picture.

The source and decoded picture are each comprised of one or more sample arrays, such as one of the following sets of sample arrays:

- Luma (Y) only (monochrome);
- Luma and two chroma (YCbCr or YCgCo);
- Green, Blue and Red (GBR, also known as RGB);
- Arrays representing other unspecified monochrome or tri-stimulus color samplings (for example, YZX, also known as XYZ).

A picture may be defined to be either a frame or a field. A frame comprises a matrix of luma samples and possibly the corresponding chroma samples. A field is a set of alternate sample rows of a frame, and may be used as encoder input, when the source signal is interlaced. Chroma sample arrays may be absent (and hence monochrome sampling may be in use) or chroma sample arrays may be subsampled when compared to luma sample arrays.

A bitstream may be defined as a sequence of bits, which may in some coding formats or standards be in the form of a network abstraction layer (NAL) unit stream or a byte stream, that forms the representation of coded pictures and associated data forming one or more coded video sequence. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of the bitstream (EOB) NAL unit and which is the last NAL unit of the bitstream.

The phrase "along the bitstream" (e.g., indicating along the bitstream) or along a coded unit of a bitstream (e.g., indicating along a coded tile) may be used in claims and described embodiments to refer to transmission, signaling or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signalling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

Hybrid video codecs, for example ITU-T H.263 and H.264 may encode video information in two phases. At first, pixel values in a certain picture area (or "block") are predicted for example by motion compensation means (finding and indicating an area in one of the previously coded video frames that correspond closely to the block being coded) or by spatial means (using the pixel values around the block to be coded in a specified manner). In the first phase, predictive coding may be applied, for example, as so-called sample prediction and/or so-called syntax prediction. In the sample prediction, pixel of sample values in a certain picture area or "block" are predicted. These pixel or sample values can be predicted, for example, using one or more of motion compensation or intra prediction mechanism. Secondly, the prediction error, i.e., the difference between the predicted block of pixels and the original bock of pixels is coded. This may be done by transforming the difference in pixel values a specified transform (e.g., Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

The example of the encoding process is illustrated in FIG. 1. FIG. 1 illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

In some video codecs, such as H.265/HEVC, video pictures are divided into coding units (CU) covering the area of the picture. A CU comprises one or more prediction units (PU) defining the prediction process for the samples within the CU and one or more transform units (TU) defining the prediction error coding process for the samples in said CU.

A CU may comprise a square block of samples with a size selectable from a predefined set of possible CU sizes. A CU with the maximum allowed size may be named as LCU (largest coding unit) or CTU (coding tree unit), and the video picture may be divided into non-overlapping CTUs. A CTU can be further split into a combination of smaller CUs, e.g., by recursively splitting the CTU and resultant CUs. Each resulting CU may have at least one PU and at least one TU associated with it. Each PU and TU can be further split into smaller PUs and TUs in order to increase the granularity of the prediction and prediction error coding processes, respectively. Each PU has prediction information associated with it, defining what kind of a prediction is to be applied for the pixels within that PU (e.g., motion vector information for inter predicted PUs and intra prediction directionality information for intra predicted PUs). Similarly, each TU is associated with information describing the prediction error decoding process for the samples within said TU (including e.g., DCT coefficient information). It may be signalled at CU level, whether prediction error coding is applied or not for each CU. In the case there is no prediction error residual associated with the CU, it can be considered there are no Tus for said CU. The division of the image into CUs, and division of CUs into PUs and TUs may be signaled in the bitstream allowing the decoder to reproduce the intended structure of these units.

Figure 2:
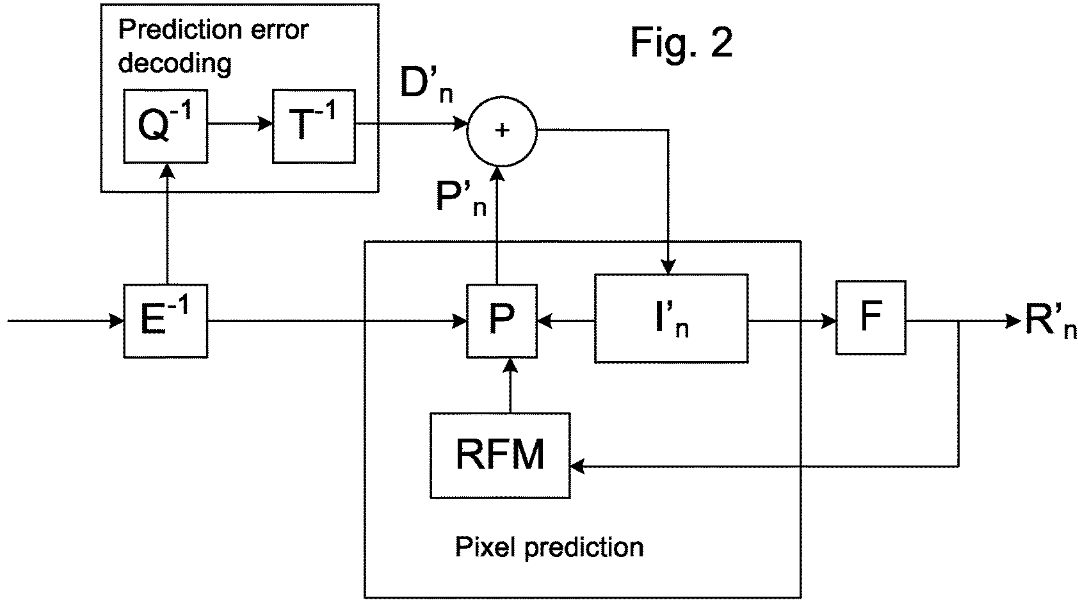
FIG. 2 shows an example of a decoding process.

The decoder may reconstruct the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means, the decoder is configured to sum up the prediction and prediction error signals (pixel values) to form the output video frame. The decoder (and encoder) can also apply additional filtering means to improve the quality of the output video before passing it for display and/or storing it as prediction reference for the forthcoming frames in the video sequence. An example of a decoding process is illustrated in FIG. 2. FIG. 2 illustrates a predicted representation of an image block ($P'_n$); a reconstructed prediction error signal ($D'_n$); a preliminary reconstructed image ($I'_n$); a final reconstructed image ($R'_n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Instead, or in addition to approaches utilizing sample value prediction and transform coding for indicating the coded sample values, a color palette-based coding can be used. Palette based coding refers to a family of approaches for which a palette, i.e., a set of colours and associated indexes, is defined and the value for each sample within a coding unit is expressed by indicating its index in the palette. Palette based coding can achieve good coding efficiency in coding units with a relatively small number of color (such as image areas which are representing computer screen content, for example text or simple graphics). In order to improve the coding efficiency of palette coding, different kinds of palette index prediction approaches can be utilized, or the palette indexes can be run-length coded to be able to represent larger homogenous areas efficiently. Also, in the case the CU contains sample values that are not recurring within the CU, escape coding can be utilized. Escape coded samples are transmitted without referring to any of the palette indexes. Instead, their values may be indicated individually for each escape coded sample.

When a CU is coded in palette mode, the correlation between pixels within the CU is exploited using various prediction strategies. For example, mode information can be signaled for each row or pixels that indicates one of the following: the mode can be horizontal mode meaning that a single palette index is signaled and the whole pixel line shares this index; the mode can be vertical mode, where the whole pixel line is the same with the above line, and no further information is signaled; the mode can be normal mode where a flag is signaled for each pixel position to indicate whether it is the same with one of the left and other pixels—and if not, the color index itself is separately transmitted.

In video codecs, the motion information may be indicated with motion vectors associated with each motion compensated image block. Each of these motion vectors may represent the displacement of the image block in the picture to be coded (at the encoder side) or decoded (at the decoder side), and the prediction sources block in one of the previously coded or decoded pictures. In order to represent motion vectors efficiently, those may be coded differentially with respect to block specific predicted motion vectors. In video codecs, the predicted motion vectors may be created in a predefined way, for example calculating the media of the encoder or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information may be signaled among a list of motion field candidate list filled with motion field information of available adjacent/co-located blocks.

Video codecs may support motion compensated prediction from one source image (uni-prediction) and two sources (bi-prediction). In the case of uni-prediction, a single motion vector may be applied whereas in the case of bi-prediction, two motion vectors may be signaled and the motion compensated predictions from two sources may be averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where a block of samples can be copied from the same picture to form a prediction of the block to be coded or decoded. This kind of intra block copying methods can improve the coding efficiency substantially in presence of repeating structures within the frame-such as text or other graphics.

In video codecs, the prediction residual after motion compensation or intra prediction may be first transformed with a transform kernel (like DCT "Discrete-Cosine Transform") and then coded. The reason for this is that often there still exists some correlation among the residual and transform can in many cases help reduce this correlation and provide more efficient coding.

Video encoders may utilize Lagrangian cost functions to find optimal coding modes, e.g., the desired macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R \quad \text{(Eq. 1)}$$

where C is the Lagrangian cost to be minimized, D is the image distortion (e.g., Mean Squared Error) with the mode and motion vectors considered, and R is the number or bits needed to represent the required data to reconstruct the image block in the decoder (including the amount of data to represent the candidate motion vectors).

Scalable video coding refers to coding structure where one bitstream can contain multiple representation of the content at different bitrates, resolutions, or frame rates. In these cases, the receiver can extract the desired representation depending on its characteristics (e.g., resolution that matches best the display device). Alternatively, a server or a network element can extract the portions of the bitstream to be transmitted to the receiver depending on e.g., the network characteristics or processing capabilities of the receiver. A scalable bitstream may comprise a "base layer" providing the lowest quality video available and one or more enhancement layers that enhance the video quality when received and decoded together with the lower layers. In order to improve the coding efficiency for the enhancement layers, the coded representation of that layer may depend on the lower layers. E.g., the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codec using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and may indicate its use with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

In addition to quality scalability, following scalability modes exist:

Spatial scalability: Base layer pictures are coded at a lower resolution than enhancement layer pictures.

Bit-depth scalability: Base layer pictures are coded at lower bit-depth (e.g., 8 bits) than enhancement layer picture (e.g., 10 or 12 bits).

Chroma format scalability: Enhance layer picture provide higher fidelity in chroma (e.g., coded in 4:4:4 chroma format) than base layer picture (e.g., 4:2:0 format).

In the aforementioned scalability cases, base layer information can be used to code enhancement layer to minimize the additional bitrate overhead.

Scalability can be enabled in two ways: a) by introducing new coding modes for performing prediction of pixel values or syntax from lower layers of the scalable representation; or b) by placing the lower layer pictures to the reference picture buffer (decoded picture buffer, DPB) of the higher layer. Approach a) is more flexible, and thus can provide better coding efficiency in most cases. However, the approach b), i.e., the reference frame-based scalability, can be implemented very efficiently with minimal changes to single layer codecs while still achieving majority of the coding efficiency gains available. A reference frame-based scalability codec can be implemented by utilizing the same hardware or software implementation for all the layers, just taking care of the DPB management by external means.

In order to be able to utilize parallel processing, images can be split into independently codable and decodable image segments (slices or tiles). Slices may refer to image segments constructed of certain number of basic coding units that are processed in default coding or decoding order, while tiles may refer to image segments that have been defined as rectangular image regions that are processed at least to some extent as individual frames.

A video may be encoded in YUV or YCbCr color space that is found to reflect some characteristics of the human visual system and allows using lower quality representation for Cb and Cr channels as human perception is less sensitive to the chrominance fidelity those channels represent.

Different cross-component prediction approaches using linear models have been used in some video codecs, such as the VVC/H.266 video codec. Such approach generates a linear model that can be used to map luma sample values to chroma sample values. The parameters of the linear model are constructed using the available reconstructed luma and chroma reference samples outside the borders of the prediction block. Once the parameters are constructed, the linear model specified by those parameters is used to predict chroma sample values inside the prediction block.

Applying a cross-component linear model prediction to predict chroma samples can be efficient compared to intra-component spatial prediction as the texture of the reconstructed luma block can sometimes generate a very good predictors for the chroma texture if there is a strong linear correlation between the luma and chroma channels. Coding efficiency of such models can be further improved by including additional parameters or coefficients to the model. However, that leads to relatively complicated and computationally demanding process to determine optimized values for those parameters.

Cross-component linear model prediction is used for example in the VVC/H.266 video codec. In that variant, there are three chroma prediction modes using cross-component linear model prediction. One of those can be selected as prediction mode for the chroma prediction blocks by encoder and signaled in the bitstream to the decoder. The difference between the three modes is set of reference samples used for generating parameters for the linear model. One of the modes uses only samples above the prediction block; one of the models uses only samples left of the prediction block; and one of the modes uses samples both above and left of the prediction block. In order to keep the complexity of the parameter generation low, the parameters are calculated using only a subset of the reference samples available on the block boundaries.

One possibility to calculate the parameters for such linear model is using linear regression for example as given in the JVET (Joint Video Experts Team) contribution JVET-D0110. In this implementation there can be two linear models operating in a different rage of the luma spectrum. Another possibility is to derive parameters for a traditional cross-component model by using different types of linear regression tools, such as ordinary least-squares estimation, orthogonal matching pursuit, optimized orthogonal matching pursuit, ridge regression, or least absolute shrinkage and selection operator.

The present embodiments relate to a solution generating an autocorrelation matrix and a cross-correlation vector from a set of reference data, such as luma and chroma sample values in the neighbourhood of a block of samples that is to be predicted using a convolutional cross-component filter. There may be different (kinds of) cross-correlation vectors in different variants, however, only one of them is often active at a time. The reference data may also be referred to as "training data", as the filter coefficients of the filter are calculated or "trained" using that data. The reference data consist of two sets: input data and target data (or output data). The intention of the generated filter is to provide an accurate mapping from input data to target data. In the case of convolutional cross-component filter, the input data can be configured to include luma samples in the neighbourhood of the sample block and the target data can be configured to include chroma data in the neighbourhood of the sample block. The autocorrelation matrix and cross-correlation vector may be optionally scaled based on the bit depth of the video content, prior to decomposing the autocorrelation matrix and solving parameters of the system using a set of back-substitution processes. The solved parameters of the system represent filter coefficients of a convolutional cross-component filter that can be applied to predict chroma values from luma values for a chroma sample block. The system is configured to use a scaling vector generated during the matrix decomposition to perform an intermediate scaling between two back-substitutions. Additionally, the present embodiments define a way how to reduce the computational requirements of the process and dimensionality of the system by different means, for example, by excluding the bias term from the system of linear equations and estimating it separately. With respect to the present embodiments, term "encoder" refers to both video and still image encoder. Similarly, term "decoder" refers to both video and still image decoder.

Different data structures containing multiple scalar values are represented here in the forms of matrices and vectors for simplicity. Naturally those can be represented or implemented also in other forms. For example, those can be represented or implemented as arrays, lists, other collections of scalar values, or sets of individual scalar values.

To carry out a method according to present embodiments, parameters of a filter, such as a convolutional cross-component filter, are calculated, which parameters can be represented by a vector x, and which can be convolved with an input vector z to produce e.g., a predicted sample value to be used in video or image coding purposes. The input vector z can contain, for example, luma samples or down-sampled luma samples at predetermined positions with respect to a predicted chroma sample which is calculated as an output of the filtering operation. The vector x can consist of n parameters and can be given as follows:

$$x = [x_0 \ \dots \ x_{n-1}]^T$$

The input vector z can also consist of n input values and can be given as:

$$z = [z_0 \ \dots \ z_{n-1}]^T$$

Predicted sample value p can then be calculated by convolving or multiplying the input z with filter parameter vector x as:

$$p = x^T z = \sum_{i=0}^{i=n-1} x_i z_i$$

Input vector z can be configured to include for example luminance sample values, functions of luminance sample values or constants or a combination of those. Including a constant in input vector z corresponds to adding a constant to the output of the filter p. This kind of a constant can be referred to as a bias term or bias parameter and can be used to represent offsets between input and output values.

Filter parameters x can be generally calculated by finding a solution to a set of equations that can be represented in the matrix form as:

$$Ax=y$$

where A represents an autocorrelation matrix of determined input reference samples or "training" samples used in the process and y represents a cross-correlation vector between the input training samples and corresponding target training samples. Items in the n×n matrix A and vector y with n values can be calculated for example as follows:

$$A(c, d) = \sum_{i=0}^{i=N-1} R(i, c)R(i, d)$$

$$y(c) = \sum_{i=0}^{i=N-1} R(i, c)s(i)$$

where N is the number of training vectors included in the process, R matrix contains input training vectors as its rows and s represents a vector with the output training samples. The same can be given in the form of pseudo code as follows:

```
A = zeroMatrixOfSize(n, n)
for c = 0, ... , n − 1
  for d = 0, ... , n − 1
    for i = 0, ... , N − 1
      A[c][d] += R[i][c] * R[i][d]
```

-continued

```
y = zeroVectorOfSize(n)
for c = 0, ... , n − 1
    for i = 0, ... , N − 1
        y[c] += R[i][c] * s[i]
```

where zeroMatrixOfSize(n, n) returns a matrix of size n×n with all values zero and zeroVectorOfSize(n) returns a vector of size n with all values zero.

As the resulting A matrix is symmetric (that is, A [c] [d] is equal to A [d] [c]), it is enough to calculate either the upper triangular or lower triangular part of the matrix. This can be done, for example, by starting the loop relating to parameter d using the current value of parameter c as follows:

```
A = zeroMatrixOfSize(n, n)
for c = 0, ... , n − 1
  for d = c, ... , n − 1
    for i = 0, ... , N − 1
      A[c][d] += R[i][c] * R[i][d]
```

In order to allow the vector x to be calculated using fixed point arithmetic, the values of the matrix A and vector y are scaled based on the bit depth of the video or image content. This can be done for example by including a bitwise shifting operation in the process of calculating the matrix A and vector y as follows:

```
A = zeroMatrixOfSize(n, n)
for c = 0, ... , n − 1
  for d = c, ... , n − 1
    for i = 0, ... , N − 1
      A[c][d] += R[i][c] * R[i][d] ≪ shift
y = zeroVectorOfSize(n)
for c = 0, ... , n − 1
  for i = 0, ... , N − 1
    y[c] += R[i][c] * s[i] ≪ shift
```

or it can be done after the summation operations as follows:

```
A = zeroMatrixOfSize(n, n)
for c = 0, ... , n − 1
  for d = c, ... , n − 1
    for i = 0, ... , N − 1
      A[c][d] += R[i][c] * R[i][d]
    A[c][d] = A[c][d] ≪ shift
```

-continued

```
y = zeroVectorOfSize(n)
for c = 0, ... , n − 1
  for i = 0, ... , N − 1
    y[c] += R[i][c] * s[i]
  y[c] += y[c] << shift
```

or other ways. For example, generating intermediate matrix A and vector y without shifting and scanning those once more and perform the shifting during the second scanning.

In addition to, or instead of performing the shift based on bit depth of the content, other aspects can be considered also. For example, values in matrix A and vector y can be shifted based on the number of training vectors or samples included in the process of generating A and y, or some approximation of such number. The shift can also be signaled in the video bitstream or derived from syntax elements or parameters signaled in a video bitstream.

As an example, the shift can be calculated as $$\text{shift} = e - f - g$$

where e can represent a bit shift relating to maximum dynamic range allowed for the values in matrix A and vector y. It can be set for example to 30, 28, 26, 24 or 16, or other value found suitable for the purpose. Value f can represent shift relating to the bit depth of the video or image content being processed. As both matrix A and vector y are typically generated by multiplying values having similar or same precision as the video or image content with another value of same characteristics it is advantageous to use twice the value of the bit depth of the content as the value of f. Thus, for example for 10-bit video or image content, the value of f could be set to 20. The value g can represent the shift relating to number of training samples of vectors included in construction of matrix A and vector y. For example, logarithm of 2 or a multiple of logarithm of 2 of the number of training vectors or samples could be used as the value of g. Alternatively, the value of g could be set to a constant and combined with the value of e to simplify determination of the shift value. In the case the determined value of the shift is a positive one, a bitwise left shift could be performed and in the case it is negative, a bitwise right shift could be performed. Again, to further simplify the shifting process, the shift can be specified to have only positive or negative values and the case determination of the value for the shift violates the specified limit, a zero value for the shift can be used.

As further examples, the shift parameter can be calculated using one of the notations below:

$$\text{shift} = B - 2 * \text{bitDepth} - \log2(N), \text{ or}$$

$$\text{shift} = B - 2 * \text{bitDepth}$$

where B is a constant known to both video encoder and decoder, bitDepth is a measure of the bit depth of the video content and can be a function of the bit depth of the luma channel, chroma channel or a combination of those. Nin the above equations can represent the number of training or reference samples used in the matrix generation process or an estimate of it. log2(N) operator can refer to logarithm of 2 of the value N and can include rounding to up, down or to the closest integer value. Also, other selections can be made. For example, instead or in addition to the number of reference samples, the number of samples to be predicted with the filter can be selected as one of the basis for calculating the shift parameter.

To solve the filter coefficients $x_i$ in vector x in the Ax=y equation, a matrix decomposition based approach is used. Different decompositions can be selected for that process. For example, LDL decomposition, Cholesky decomposition or QR decomposition can be used. For example, an implementation described by the pseudo code below can be used, with matrix A as input and upper triangular matrix U and a vector d as output:

```
for i = 0, ..., n−1
{
 d[i] = A[i][i]
 for k = i − 1, ..., 0
 {
  t   = MULT(U[k][i], U[k][i])
  d[i] −= MULT(t, d[k]);
 }
 if d[i] <= singularityThreshold
 {
  return false;
 }
 for j = i + 1, ..., n
 {
  s = A[i][j]
  for k = i − 1, ..., 0
  {
   t = MULT(U[k][j], U[k][i])
   s −= MULT(t, d[k])
  }
  U[i][j] = DIV(s, d[i])
 }
}
```

By performing this decomposition, the upper triangular output matrix U corresponds to the transpose of the lower triangular L matrix of LDL decomposition and output vector d contains the values of the diagonal elements of the diagonal matrix D of LDL decomposition. Values of the output vector d (i.e., a scaling vector) can be referred to as scaling values as those are used to scale the values of the triangular matrix and also to scale intermediate values when solving the decomposed system. Values of scaling vector d can be represented for example as a vector, an array, a list, or diagonal elements of a matrix. In order to save memory in a software or hardware implementation the values of the vector d can be stored as diagonal elements of the output matrix U which otherwise have unspecified value in an implementation according to the pseudo code example above.

As an alternative example, a lower triangular matrix L can be generated. As a result, filter coefficient vector x of equation $$Ax=y$$

can now be solved by back-substitution and scaling operations after substituting A with its LDL decomposition:

$$LDL^T x=y$$

or using the U matrix calculated by the pseudo code example:

$$U^T DUx=y$$

The filter coefficient vector x can now be solved with three steps. In the first one, the DUx term can be marked as an intermediate vector z, which can be solved by back-substitution:

$$DUx=z$$

$$U^T z=y$$

In the second step D can be removed by dividing or scaling the elements of the intermediate vector z by the elements of the vector d:

$$Ux=z \varnothing d$$

In the third step, as the above equation is again in the form of an upper/lower triangular matrix multiplied by a vector x equaling to another vector, the vector x can be solved directly using back-substitution. The overall process of solving the filter coefficients can thus be configured to have three stages: first back-substitution process, scaling process and a second back-substitution process. The scaling process between two back-substitutions is advantageously performed using a vector generated as a product of a matrix decomposition.

The multiplication operation MULT and division operation DIV can be implemented in different ways. For example, floating point or fixed point implementation can be used. As fixed point implementation may offer faster execution on some computational architectures it may be beneficial generally to use fixed point arithmetic. In order to advantageously balance between the numerical stability of the calculation process and accuracy of the fixed point presentation, the MULT operation can be performed with rounding towards the closest integer number while the DIV operation can be performed with rounding towards zero. For example, the functions can be defined in pseudo code as follows:

```
MULT(x, y)
{
 return ( x * y + (1 << ( DECIM_BITS − 1) ) >> DECIM_BITS
}
DIV(x, y)
{
 return ( x << DECIM_BITS ) / y
}
```

Alternatively, the DIV operation can be implemented, for example, as a combination of table look-up operations and bitwise shift operations. It can also include rounding terms, as the MULT function has in the above example. The DECIM_BITS parameter determines the number of decimal bits in the fixed point representation and can be set to different values depending on the desired accuracy of the operations.

Back-substitution can be performed in different ways. For example, following pseudo code can be used:

```
z[0] = y[0];
for i = 1, ..., numEq − 1
{
 sum = 0
 for j = 0, ..., i−1
 {
  sum += MULT(z[j], U[j][i])
 }
 z[i] = y[i] − sum
}
```

The dependencies between the process of building the matrix decomposition and the process of solving the filter coefficients from the system of equations can be jointly optimized. For example, the division operations in matrix decomposition and division operations between or during the back-substitution process can be configured to use the same denominator $d_i$ (corresponding to the diagonal elements of matrix D or elements of the diagonal vector d in the examples above and the d [i] terms in the pseudo code examples). Instead of dividing by di in those cases the operation can be advantageously converted to a multiplication with the inverse of that number $1/d_i$. In this way only a single division operation is needed to calculate the inverse of each diagonal element, thus reducing the number of division operation to one per each output coefficient.

Solving the filter coefficients is advantageously performed with two back-substitution processes with a scaling operation between those. The scaling operation scales the output values of a first back-substitution process with values generated as output of a matrix decomposition operations. The scaling can include for example multiplication, division or bit-shifting operations or a combination of those.

In some cases, the autocorrelation matrix A may be singular. Values of diagonal vector d can be used as a measure of singularity. In the example pseudo code above, each element of d (d [i]) is compared against a threshold value singularity Threshold to determine singularity. Value of singularityThreshold can be determined in different ways. For example, it can be set to a determined value, such as 0 or other integer or floating point number. It can also be calculated based on the bit depth of the video content or characteristics of the A matrix.

In the case the matrix A is determined singular, different actions can be taken. For example, regularization term can be added to the diagonal elements of matrix A and the decomposition can be tried again. However, this kind of an approach can roughly double the worst case complexity of the decomposition operation as the decomposition can be done at least partially twice. Advantageously, matrix A is regularized by adding a positive term to each of its diagonal element before attempting to decompose the matrix. Value of the positive term can be determined differently. For example, a constant value of 1 or other constants may be used as the regularization term. The value of the term can also be determined based on the bit depth of the video content or characteristics of the matrix A. If matrix A is still found singular during the first attempt to decompose it, the filter coefficient vector x is advantageously set to a vector that is independent from matrix A and additional attempts to decompose matrix A can be omitted. This approach limits the number of matrix decomposition attempts to one, roughly halving the worst case complexity of an approach which regularizes matrix A after a failed decomposition. Different approaches can be used to determine the filter coefficient vector x independent from matrix A. For example, all the elements of x can be set to zero, or the element relating to the bias term of the filter can be set to value derived from the bit depth of the video, or from the average luma and chroma values of the reference samples and the rest of the elements can be set to zero.

There are different ways to reduce computational complexity associated with calculating the filter coefficients $x_i$. For example, in the case a convolutional filter is used to predict chroma values based on input luma values, it may be desirable to include so called bias term into the filtering process. A bias term can be considered a constant to be added to the filter output. One way to implement such a bias to make one of the inputs $z_b$ to be a constant (e.g., a value corresponding to the middle luma value, such as value 512 for 10-bit video content, or 128 for 8-bit video content). With such selection, the corresponding filter coefficient $x_b$ determines the value of the bias to be added to the filter output. The bias term $x_b$ can be calculated as described above as one of the filter coefficients in vector x. However, it can also be estimated in other ways. For example, if the input to the filter is luma values and output a predicted luma and the filter is generated using a set of reference luma and chroma samples, the average reference luma value $y_{mean}$ and average reference chroma sample value $c_{mean}$ can be calculated. When calculating the filter coefficients, $y_{mean}$ can be deducted from the reference luma values and $c_{mean}$ can be calculated from the reference chroma samples before or when generating the autocorrelation matrix A and crosscorrelation vector y. Similarly, $y_{mean}$ can be deducted from the input luma samples when performing the convolution operation to calculate the filter output. The bias between the luma and chroma samples can then be recovered by adding the average reference chroma value $c_{mean}$ to the output of the filter as formulated below:

$$p = x^T z + c_{mean} = \left( \sum_{i=0}^{i=n-1} x_i z_i \right) + c_{mean}$$

An encoder or a decoder can be configured to calculate a subset of filter coefficients from the decomposed autocorrelation matrix and the cross-correlation vector. This can be done advantageously by performing the back substitution operations for only those elements which correspond to the set of coefficients to be solved from the system of equations.

In an embodiment a set of filter coefficients is determined using a first back-substitution process, a scaling process and a second back-substitution process.

In an embodiment a set of filter coefficients is determined based on a autocorrelation matrix that is decomposed at least into a triangular matrix and a set of scaling values.

In an embodiment an autocorrelation matrix is decomposed at least into a triangular matrix a set of scaling values where the scaling values are represented as a vector, an array, a list, or diagonal elements of a matrix.

In an embodiment a set of filter coefficients is determined using a first back-substitution, a scaling and a second back-substitution, wherein the scaling is performed with values generated by decomposing a matrix.

In an embodiment a set of filter coefficients is determined using a first back-substitution, a scaling and a second back-substitution, wherein the scaling is performed with values generated by decomposing an autocorrelation matrix.

In an embodiment an autocorrelation matrix is decomposed at least into a triangular matrix a set of scaling values using floating point operations.

In an embodiment an autocorrelation matrix is decomposed at least into a triangular matrix a set of scaling values using fixed point operations.

In an embodiment an autocorrelation matrix is decomposed at least into a triangular matrix a set of scaling values using fixed point operations, where a fixed point multiplication is configured to include rounding to closest fixed point value and a fixed point division operation is configured to include rounding towards zero.

In an embodiment a set of determined scaling factors are applied between two back-substitution processes.

In an embodiment, elements of an autocorrelation matrix and a cross-correlation vector are shifted using bit-shifting operations for which the amount of bit-shifting is determined based on bit depth of video content.

In an embodiment, elements of an autocorrelation matrix and a cross-correlation vector are shifted using bit-shifting operations for which the amount of bit-shifting is determined based on a number of reference samples or a measure that is based on a number of reference samples.

In an embodiment, elements of an autocorrelation matrix and a cross-correlation vector are shifted using bit-shifting operations for which the amount of bit-shifting is determined based on a number of samples to be predicted or a measure that is based on a number of samples to be predicted.

In an embodiment, elements of an autocorrelation matrix and a cross-correlation vector are shifted using bit-shifting operations for which the amount of bit-shifting is determined based on bit depth of video content and number of reference samples used to generate the autocorrelation matrix and the cross-correlation vector.

In an embodiment singularity of autocorrelation matrix is determined during the decomposition by comparing output scaling value with an integer valued threshold value.

In an embodiment, filter coefficients are set to zero if the autocorrelation matrix is determined to be singular.

In an embodiment all filter coefficients except the bias term are set to zero if the autocorrelation matrix is determined to be singular.

In an embodiment the bias term of filter coefficients is set to a value representing average of the reference chroma values if the autocorrelation matrix is determined to be singular.

In an embodiment the bias term of filter coefficients is set to a value representing 512 for 10-video and to a value 128 for 8-bit video if the autocorrelation matrix is determined to be singular.

In an embodiment, positive values are added to the diagonal elements of the autocorrelation matrix before decomposition.

In an embodiment average luma value is deducted from the luma values and average chroma value is deducted from the chroma values when determining the autocorrelation matrix and cross-correlation vector, where average luma and chroma values are calculated using a set of reference samples.

In an embodiment average luma value is deducted from the input luma values prior to applying convolutional filtering operation and average chroma value is added to the filter output, where average luma and chroma values are calculated using a set of reference samples.

In an embodiment a back-substitution process is applied to a selected subset of elements in triangular matrix and target vector.

In an embodiment the set of determined filter coefficients are used to predict chroma values from luma values.

Figure 3:
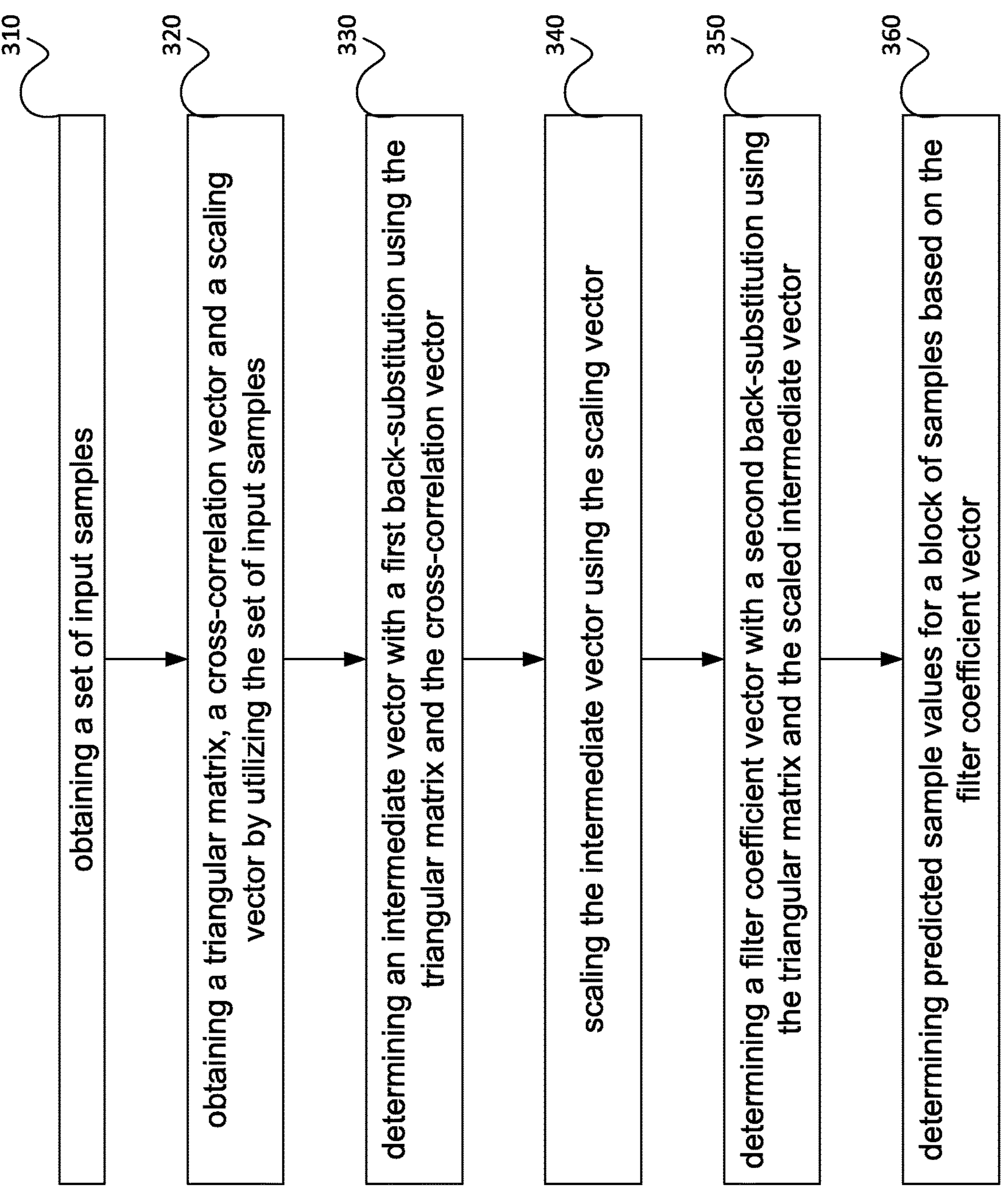
FIG. 3 is a flowchart illustrating a method according to an embodiment.
Figure 4:
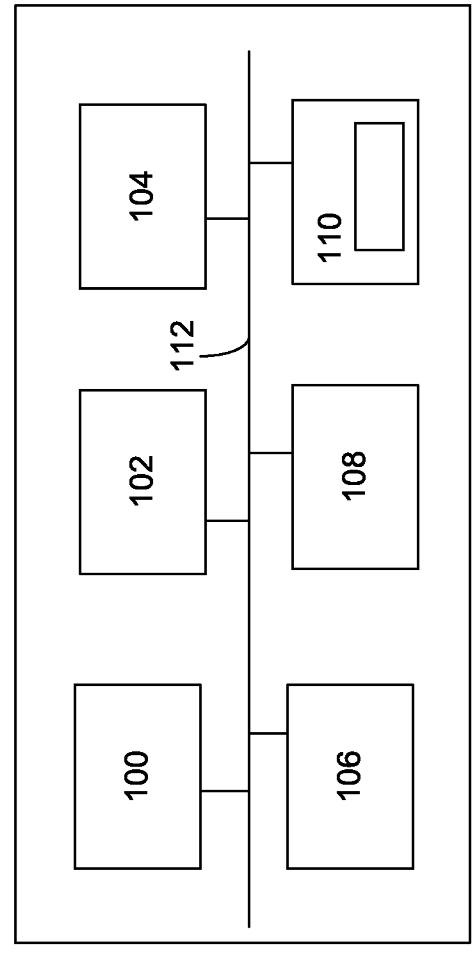
FIG. 4 shows an apparatus according to an embodiment.

The method according to an embodiment is shown in FIG. 3. The method generally comprises obtaining 310 a set of input samples; obtaining 320 a triangular matrix, a cross-correlation vector and a scaling vector by utilizing the set of input samples; determining 330 an intermediate vector with a first back-substitution using the triangular matrix and the cross-correlation vector; scaling 340 the intermediate vector using the scaling vector; determining 350 a filter coefficient vector with a second back-substitution using the triangular matrix and the scaled intermediate vector; and determining 360 predicted sample values for a block of samples based on the filter coefficient vector. Each of the steps can be implemented by a respective module of a computer system.

An apparatus according to an embodiment comprises means for obtaining a set of input samples; means for obtaining a triangular matrix, a cross-correlation vector and a scaling vector by utilizing the set of input samples; means for determining an intermediate vector with a first back-substitution using the triangular matrix and the cross-correlation vector; means for scaling the intermediate vector using the scaling vector; means for determining a filter coefficient vector with a second back-substitution using the triangular matrix and the scaled intermediate vector; and means for determining predicted sample values for a block of samples based on the filter coefficient vector. The means comprises at least one processor, and a memory including a computer program code, wherein the processor may further comprise processor circuitry. The memory and the computer program code are configured to, with the at least one processor, cause the apparatus to perform the method of FIG. 3 according to various embodiments.

The various embodiments can be implemented with the help of computer program code that resides in a memory and causes the relevant apparatuses to carry out the method. For example, a device may comprise circuitry and electronics for handling, receiving, and transmitting data, computer program code in a memory, and a processor that, when running the computer program code, causes the device to carry out the features of an embodiment. Yet further, a network device like a server may comprise circuitry and electronics for handling, receiving, and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus, comprising at least one processor, memory including computer program code, the memory and the computer program code configured to, with the at least one processor, cause the apparatus to perform at least the following obtaining a set of input samples;

obtaining an autocorrelation matrix, a cross-correlation vector and a scaling parameter by utilizing the set of input samples;

determining bit depth of the input samples;

determining a number of samples in the set of input samples;

determining the scaling parameter based on the bit depth of the input samples and the number of samples in the set of input samples;

scaling the autocorrelation matrix and the cross-correlation vector using the scaling parameter;

determining a filter coefficient vector based on the scaled autocorrelation matrix and scaled cross-correlation vector; and determining predicted sample values for a block of samples based on the filter coefficient vector.

2. The apparatus according to claim 1, wherein the apparatus upon execution is further caused to perform determining a triangular matrix and a scaling vector by decomposing an autocorrelation matrix at least into the triangular matrix and the scaling vector, wherein the autocorrelation matrix is calculated using a set of reference samples in a determined neighborhood of the block of samples.

3. The apparatus according to claim 2, wherein the apparatus upon execution is further caused to perform determining the autocorrelation matrix and the cross-correlation vector by deducting an average luma value from a set of luma values and deducting an average chroma value from a set of chroma values.

4. The apparatus according to claim 1, wherein the apparatus upon execution is further caused to perform including a bitwise shifting operation in process of determining the autocorrelation matrix and the cross-correlation vector.

5. The apparatus according to claim 1, wherein the set of input samples comprise one or more of the following: luminance sample values: functions of luminance sample values: or bias parameters.

6. The apparatus according to claim 1, wherein the apparatus upon execution is further caused to perform encoding the set of input samples and/or decoding the encoded set of samples.

7. A method, comprising obtaining a set of input samples;

obtaining an autocorrelation matrix, a cross-correlation vector and a scaling parameter by utilizing the set of input samples;

determining bit depth of the input samples;

determining a number of samples in the set of input samples;

determining the scaling parameter based on the bit depth of the input samples and the number of samples in the set of input samples;

scaling the autocorrelation matrix and the cross-correlation vector using the scaling parameter;

determining a filter coefficient vector based on the scaled autocorrelation matrix and scaled cross-correlation vector; and determining predicted sample values for a block of samples based on the filter coefficient vector.

8. The method according to claim 7, further comprising determining a triangular matrix and a scaling vector by decomposing an autocorrelation matrix at least into the triangular matrix and the scaling vector, wherein the autocorrelation matrix is calculated using a set of reference samples in a determined neighborhood of the block of samples.

9. The method according to claim 8, further comprising determining the autocorrelation matrix and the cross-correlation vector by deducting an average luma value from a set of luma values and deducting an average chroma value from a set of chroma values.

10. The method according to claim 7, further comprising including a bitwise shifting operation in process of calculating the autocorrelation matrix and the cross-correlation vector.

11. The method according to claim 7, wherein the set of input samples comprise one or more of the following: luminance sample values: functions of luminance sample values: or bias parameters.

12. The method according to claim 7, further comprising encoding the set of input samples and/or decoding the encoded set of samples.

13. A computer program product comprising a non-transitory computer readable storage medium having program code portions stored thereon, the program code portions configured, upon execution, to obtain a set of input samples;

obtain an autocorrelation matrix, a cross-correlation vector and a scaling parameter by utilizing the set of input samples;

determining bit depth of the input samples;

determining a number of samples in the set of input samples;

determine the scaling parameter based on the bit depth of the input samples and the number of samples in the set of input samples;

scale the autocorrelation matrix and the cross-correlation vector using the scaling parameter;

determine a filter coefficient vector based on the scaled autocorrelation matrix and scaled cross-correlation vector; and determine predicted sample values for a block of samples based on the filter coefficient vector.

14. The computer program product of claim 13, wherein the program code portions are further configured, upon execution, to determine a triangular matrix and a scaling vector by decomposing an autocorrelation matrix at least into the triangular matrix and the scaling vector, wherein the autocorrelation matrix is calculated using a set of reference samples in a determined neighborhood of the block of samples.

15. The computer program product of claim 13, wherein the program code portions are further configured, upon execution, to determine the autocorrelation matrix and the cross-correlation vector by deducting an average luma value from a set of luma values and deducting an average chroma value from a set of chroma values.

16. The computer program product of claim 13, wherein the program code portions are further configured, upon execution, to include a bitwise shifting operation in process of determining the autocorrelation matrix and the cross-correlation vector.

17. The computer program product of claim 13, wherein the set of input samples comprise one or more of the following: luminance sample values; functions of luminance sample values; or bias parameters.

* * * * *